(No Model.)
C. P. LANCASTER.
PRICE INDICATOR FOR WEIGHING SCALES.
No. 385,635. Patented July 3, 1888.
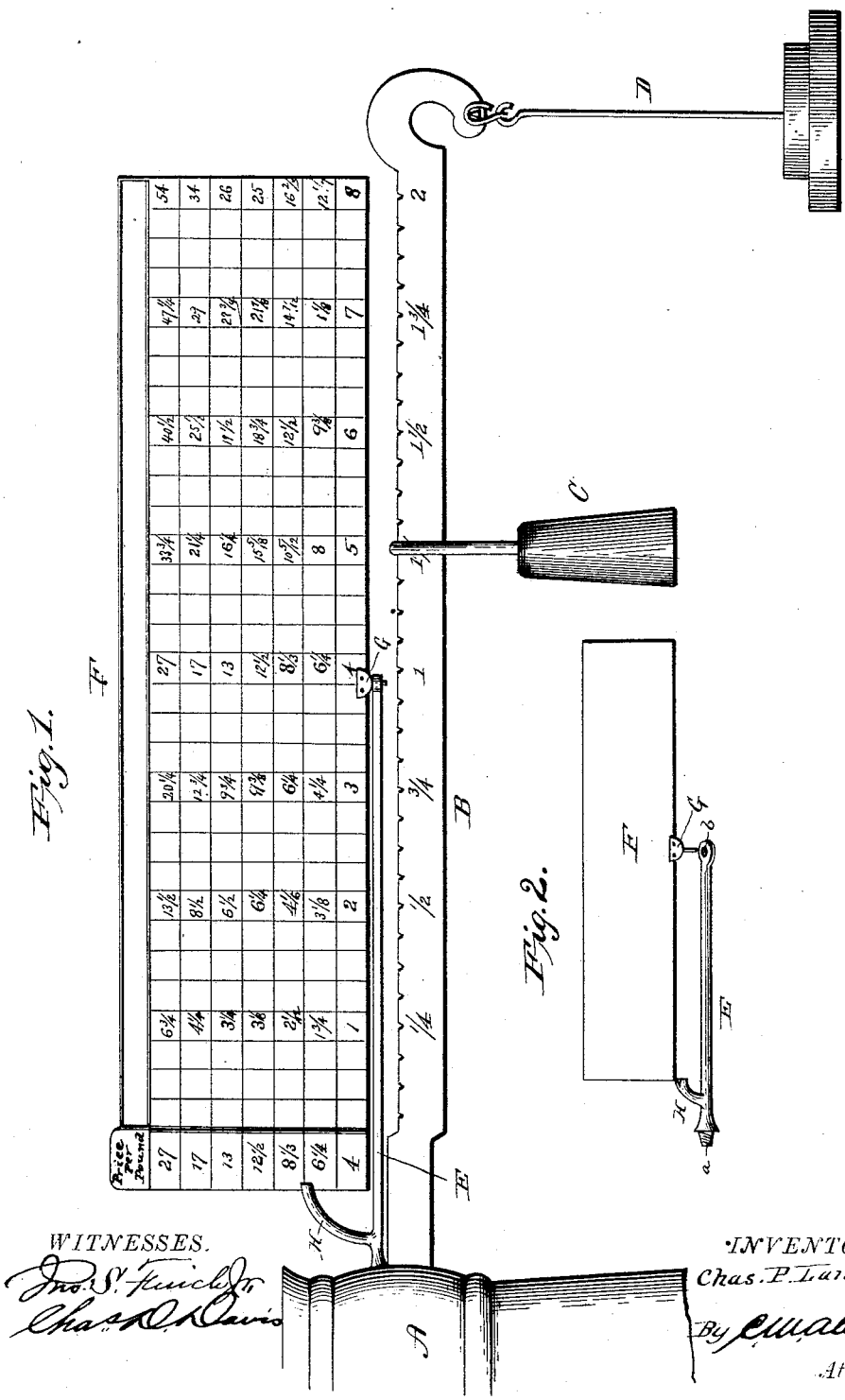
WITNESSES.
INVENTOR.
Chas. P. Lancaster.
By C. M. Alexander
Attorney.

UNITED STATES PATENT OFFICE.

CHARLES P. LANCASTER, OF FAIRMOUNT, INDIANA, ASSIGNOR OF TWO-THIRDS TO LEVI SCOTT AND JOHN H. WINSLOW, BOTH OF SAME PLACE.

PRICE-INDICATOR FOR WEIGHING-SCALES.

SPECIFICATION forming part of Letters Patent No. 385,635, dated July 3, 1888.

Application filed March 8, 1888. Serial No. 266,619. (No model.)

*To all whom it may concern:*

Be it known that I, CHARLES P. LANCASTER, a citizen of the United States, residing at Fairmount, in the county of Grant and State of Indiana, have invented certain new and useful Improvements in Price-Indicators for Scales, of which the following is a specification, reference being had therein to the accompanying drawings.

My invention has relation to certain new and useful improvements in the construction of price-indicators for scale beams, it having particular reference to that class of devices which are attached to scale-beams for the purpose of indicating the exact price of any given weight of material at different rates per pound, the calculation being made without mental effort on the part of the seller, as will be more fully hereinafter set forth.

The invention has for its object to provide an extremely simple and highly useful device that may be readily attached to the standards just above and independent of the scale-beam, of any of the weighing-scales now in universal use; and it consists in certain novel features of construction, that will be hereinafter described, and particularly pointed out in the claims appended.

Referring to the annexed drawings, which form a part of this specification, Figure 1 represents a side elevation of a scale-beam and a portion of the standard of an ordinary weighing-scale with my improved indicator attached thereto, and Fig. 2 represents a detached perspective view of the parts of the indicator.

Referring to these drawings by letter, A designates a portion of the standard of an ordinary weighing-scale; B, an ordinary graduated scale-beam projecting from one side of the said standard and provided with the usual notches or serrations in its upper edge; C, the usual scale-beam weight, which is moved along the scale-beam and rests in the notches in the upper edge thereof, and D the usual depending weight-rod pivotally hung to the free end of the scale-beam for the reception of the usual slotted weights when a larger quantity of produce is to be weighed than the scale-beam alone will permit of.

Attached to the standard A just above and in line with the scale-beam, preferably by means of a screw, *a*, is a supporting rod or bar, E, which extends out from the standard to a point about over the middle of the length of the scale-beam, and is practically parallel therewith.

F designates the indicator plate, which is approximately the same length as the scale-beam and is made of any suitable thin sheet metal. Attached in any suitable manner to the lower edge of this indicator-plate, about midway its length, is a pin or projection, G, which sets in an aperture, *b*, formed in the outer or free end of the supporting-rod E, the plate being thereby detachably supported immediately above and in line with the scale-beam. Formed on or attached to the rod E, in close proximity to the standard of the scale, is an upwardly-extending arm, H, the upper end of which is bifurcated and embraces the inner end of the indicator-plate, for the purpose of steadying the same and holding it in line with the beam.

The indicator-plate is the same length as the graduated portion of the scale-beam, and its entire surface is marked off into equal spaces or squares, forming horizontal and vertical lines of spaces which intersect each other at certain points on the plate. The first vertical column of spaces, the one nearest the scale-standard, contains figures which indicate the prices per pound of different articles or different rates per pound, and the spaces to the right of the figures in the first column contain figures which indicate the cost of any weight of merchandise at any given price per pound, the vertical columns of these figures being in line with the notches in the upper edge of the scale-beam, as shown in the drawings.

Thus, for instance, to ascertain the cost of one and one fourth pound of merchandise at four cents per pound, all the seller has to do after weighing that amount off on the scale-beam by means of the weight C is to glance at the spaces in a vertical line with the notch the weight is in until he comes to the space which is in a horizontal line with the space in the first vertical column that contains the figure 4, and he will find in that space the cost of the amount of merchandise weighed off on the beam. The face of the plate shown in the drawings is not adapted to indicate the cost of more than two pounds of merchandise, this amount being all that can be weighed by means of the weight on the beam, and therefore in order that the indicator may be still employed when more than this amount is weighed off (by the use of slotted weights on the rod D) I may mark off spaces and figures on the other face of the plate also, showing the calculations for a larger amount of merchandise, and reverse the plate, as is evident.

It will be observed that for longer scale-beams than that shown in my drawings the indicator plate would have to be lengthened and the calculations and spaces thereon carried out accordingly. Another advantage with this indicator plate is the facility with which a dealer can ascertain the amount of goods to weigh off to the customer when the latter gives his order without naming the number of pounds desired, but simply tells the amount of money he desires to invest. For instance, if a customer should ask for thirty-four cents' worth of some article whose retail price is seventeen cents per pound, all the dealer will have to do will be to find the figure 34 in the spaces in line with the figure 17 of the price-column, and then place the scale-beam weight in the notch immediately below the figure 34, and he will weigh off the proper quantity without any mental calculation whatever.

It will be observed that this device, being independent of the scale-beam, may be attached to any of the scales in common use without in the least requiring a change in the adjustment of the scale-beams.

Having thus fully described my invention, what I claim as new, and desire to secure by Letters Patent, is—

1. The combination, with the scale-standard, the scale-beam and its movable weight, of the supporting-rod E, attached to the standard and provided with the upwardly-extending arm H, bifurcated at its upper end, so as to embrace and steady the indicator-plate, the indicator-plate supported by the rod E, and means for holding the indicator plate on the said rod E, substantially as described.

2. In a scale-beam indicator, the combination of the supporting-rod E, provided with the upwardly-extending arm H, bifurcated at its upper end, so as to embrace the edge of the indicator-plate, an indicator-plate marked off and figured, and means for holding the indicator-plate on the said rod E, substantially as described.

In testimony whereof I affix my signature in presence of two witnesses.

CHARLES P. LANCASTER.

Witnesses:
ELIAS S. LANCASTER,
J. G. WORLY.